United States Patent
Chen

(10) Patent No.: US 12,082,062 B2
(45) Date of Patent: Sep. 3, 2024

(54) HANDOVER METHOD AND TERMINAL

(71) Applicant: VIVO MOBILE COMMUNICATION CO.,LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 353 days.

(21) Appl. No.: 17/509,311

(22) Filed: Oct. 25, 2021

(65) Prior Publication Data

US 2022/0046502 A1     Feb. 10, 2022

Related U.S. Application Data

(63) Continuation of application No. PCT/CN2020/086696, filed on Apr. 24, 2020.

(30) Foreign Application Priority Data

Apr. 26, 2019 (CN) .......................... 201910345898.9

(51) Int. Cl.
*H04W 36/00* (2009.01)
*H04W 74/0833* (2024.01)

(52) U.S. Cl.
CPC . *H04W 36/00837* (2018.08); *H04W 36/0058* (2018.08); *H04W 36/0061* (2013.01); *H04W 74/0841* (2013.01)

(58) Field of Classification Search
CPC ....... H04W 36/00837; H04W 36/0058; H04W 36/0061; H04W 74/0841; H04W 36/0055; H04W 74/0833; H04W 36/36; H04W 36/0011; H04W 36/0033; H04W 36/0085; H04W 36/08

See application file for complete search history.

(56) References Cited

U.S. PATENT DOCUMENTS

| | | | |
|---|---|---|---|
| 2014/0126545 | A1 | 5/2014 | Tamura et al. |
| 2016/0174124 | A1 | 6/2016 | Basu Mallick et al. |
| 2018/0317137 | A1 | 11/2018 | Loehr et al. |
| 2019/0028938 | A1 | 1/2019 | Park et al. |

(Continued)

FOREIGN PATENT DOCUMENTS

| | | | |
|---|---|---|---|
| CN | 105580427 | A | 5/2016 |
| CN | 109600800 | A | 4/2019 |

(Continued)

OTHER PUBLICATIONS

3GPP TSG-RAN WG2 #101; R2-1803336; Source: Ericsson; Title: Conditional Handover; Athens, Greece, Feb. 26-Mar. 2, 2018 (Year: 2018).*

(Continued)

*Primary Examiner* — Mohammed S Chowdhury
(74) *Attorney, Agent, or Firm* — Price Heneveld, LLP

(57) ABSTRACT

A handover method and a terminal are provided. The method includes: upon receiving indication information from a source cell during a first conditional handover, performing, by a terminal, at least one of the following operations: ignoring the indication information; continuing execution of the first conditional handover; stopping the first conditional handover; and performing, according to the indication information, an operation indicated by the indication information.

13 Claims, 2 Drawing Sheets

(56) References Cited

U.S. PATENT DOCUMENTS

| | | | | |
|---|---|---|---|---|
| 2019/0223073 | A1* | 7/2019 | Chen | H04W 36/365 |
| 2020/0022055 | A1* | 1/2020 | Yan | H04W 36/00837 |
| 2020/0229043 | A1 | 7/2020 | Yao et al. | |
| 2021/0051537 | A1* | 2/2021 | Zhang | H04W 36/36 |
| 2021/0377831 | A1* | 12/2021 | Yan | H04W 36/0077 |
| 2021/0410034 | A1* | 12/2021 | You | H04W 74/0833 |
| 2022/0174562 | A1* | 6/2022 | Da Silva | H04W 36/0058 |
| 2022/0256423 | A1* | 8/2022 | Latheef | H04W 24/08 |

FOREIGN PATENT DOCUMENTS

| | | |
|---|---|---|
| CN | 111565426 A | 8/2020 |
| EP | 3668182 A1 | 6/2020 |
| WO | 2018132051 A1 | 7/2018 |
| WO | 2019062152 A1 | 4/2019 |

OTHER PUBLICATIONS

3GPP TSG RAN WG2 Meeting #103bis ; R2-1814051; Source: Intel Corporation; Title: Discussion of conditional handover; Chengdu, China, Oct. 8-12, 2018 (Year: 2018).*

3GPP TSG RAN WG2 Meeting #105bis; R2-1903443; Source: Intel Corporation; Title: Discussion of conditional handover ; Xi'an, China, Apr. 8-12, 2019 (Year: 2019).*

LG Electronics Inc., "Consideration on CHO De-configuration and Failure", 3GPP TSG-RAN WG2 Meeting #105bis, Xi'an, R2-1905098, China, Apr. 8-Apr. 12, 2019.

China Telecom, "Configuration and deconfiguration of CHO", 3GPP TSG-RAN WG2 Meeting #105bis, R2-1904862, Xi'an, China, Oct. 8-12, 2018.

Ericsson, "Conditional Handover," 3GPP TSG-RAN WG2 #101, R2-1803336, Athens, Greece, Feb. 26-Mar. 2, 2018 (5 pages).

Samsung et al., "Remaining essential issue for NR SA Handover," 3GPP TSG-RAN2 #102, R2-1808482, Busan, Korea, May 21-25, 2018 (12 pages).

Oppo, "Discussion on failure handling of handover," 3GPP TSG-RAN2 Meeting #104, R2-1816932, Spokane, USA, Nov. 12-16, 2018 (3 pages).

Intel Corporation, "Discussion of conditional handover," 3GPP TSG RAN WG2 Meeting #105bis R2-1903443, Xi'an, China, Apr. 8-12, 2019, revision of R2-1900870 (8 pages).

Nokia, "LS on Conditional Handover in E-UTRAN and NR," 3GPP TSG-RAN WG2 Meeting #105bis R2-1905322, Xi'an, China, Apr. 8-12, 2019 (1 page).

Qualcomm Incorporated, "LTE Conditional HO design considerations," 3GPP TSG-RAN WG2 Meeting #105bis, R2-1904662, Xian, China, Apr. 8-12, 2019 (9 pages).

* cited by examiner

HANDOVER METHOD AND TERMINAL

CROSS-REFERENCE TO RELATED APPLICATIONS

This application is continuation application of PCT International Application No. PCT/CN2020/086696 filed on Apr. 24, 2020, which claims priority to Chinese Patent Application No. 201910345898.9, filed in China on Apr. 26, 2019, which are incorporated in their entireties by reference herein.

TECHNICAL FIELD

This disclosure relates to the field of communications technologies, and in particular, to a handover method and a terminal.

BACKGROUND

In a handover procedure in the related art, when a terminal initiates handover to a target cell, the terminal no longer receives a configuration or related indication information from a source cell.

To avoid failure of handover because the terminal cannot receive a handover command related message from the source cell after a channel condition of the source cell deteriorates, a conditional handover procedure is introduced.

Main steps of the conditional handover procedure in the related art are as follows:

Step 1: A source cell transmits handover request information to one or more target cells.

Step 2: The target cell feeds back handover acknowledgment information to the source cell.

Step 3: The source cell transmits configuration information for conditional handover to a terminal.

Step 4: The terminal evaluates whether the target cell satisfy a condition, and selects one target cell that satisfies the condition for handover.

Step 5: The terminal initiates a random access procedure in the selected target cell.

Step 6: The terminal transmits handover completion information to the target cell.

Step 7: The source cell transmits a conditional handover cancel command to another target cell.

Step 8: The another target cell transmits a conditional handover cancel acknowledgment command to the source cell.

To sum up, in the current conditional handover procedure, when determining that a trigger condition is satisfied, the terminal executes the handover procedure and initiates access to the target cell. In this procedure, the terminal may possibly still receive configuration or related indication information from the source cell. This indication information may have an impact on the handover execution in the related art. For example, if a terminal receives a reconfiguration, removal, or normal handover command from a source cell during a conditional handover procedure, how the terminal handles it is not yet defined in the related art.

SUMMARY

Embodiments of this disclosure provide a handover method and a terminal to resolve the lack of a corresponding handling procedure when a terminal receives indication information from a source cell during a conditional handover procedure in the related art.

To resolve the foregoing technical matter, this disclosure is implemented as follows: A handover method applied to a terminal includes:

upon receiving indication information from a source cell during a first conditional handover, performing, by the terminal, at least one of the following operations:

ignoring the indication information;

continuing execution of the first conditional handover;

stopping the first conditional handover; and performing, according to the indication information, an operation indicated by the indication information.

An embodiment of this disclosure further provides a terminal, including:

a handover module, configured to, upon receiving indication information from a source cell during a first conditional handover, perform at least one of the following operations:

ignoring the indication information;

continuing execution of the first conditional handover;

stopping the first conditional handover; and performing, according to the indication information, an operation indicated by the indication information.

An embodiment of this disclosure further provides a terminal, including a processor, a memory, and a computer program stored in the memory and capable of running on the processor, where when the computer program is executed by the processor, the steps of the foregoing handover method are implemented.

An embodiment of this disclosure further provides a computer-readable storage medium, where the computer-readable storage medium stores a computer program, and when the computer program is executed by a processor, the steps of the foregoing handover method are implemented.

In the embodiments of this disclosure, operations of a terminal after the terminal receives indication information from a source cell during a conditional handover are defined, thereby guaranteeing completeness of signaling and improving the handover procedure.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains without creative efforts based on the embodiments of this disclosure shall fall within the protection scope of this disclosure.

In the embodiments of this disclosure, terms such as "an example" or "for example" are used to represent examples, illustrations, or explanations. Any embodiment or design solution described as "an example" or "for example" in the embodiments of this disclosure shall not be interpreted as being more preferred or advantageous than other embodiments or design solutions. Specifically, the terms such as "as an example" or "for example" are used to present related concepts in a specific manner.

The terminal provided in this embodiment of this disclosure may be a mobile phone, a tablet computer, a notebook computer, an ultra-mobile personal computer (UMPC), a netbook, a wearable device, an in-vehicle device, a personal digital assistant (PDA), or the like. It should be noted that the terminal is not limited to any specific type in the embodiments of this disclosure. The embodiments of this disclosure use LTE and NR systems as examples, but are not limited thereto, and the technical solutions provided in this disclosure may be applied to other systems having the same matter.

Figure 1:
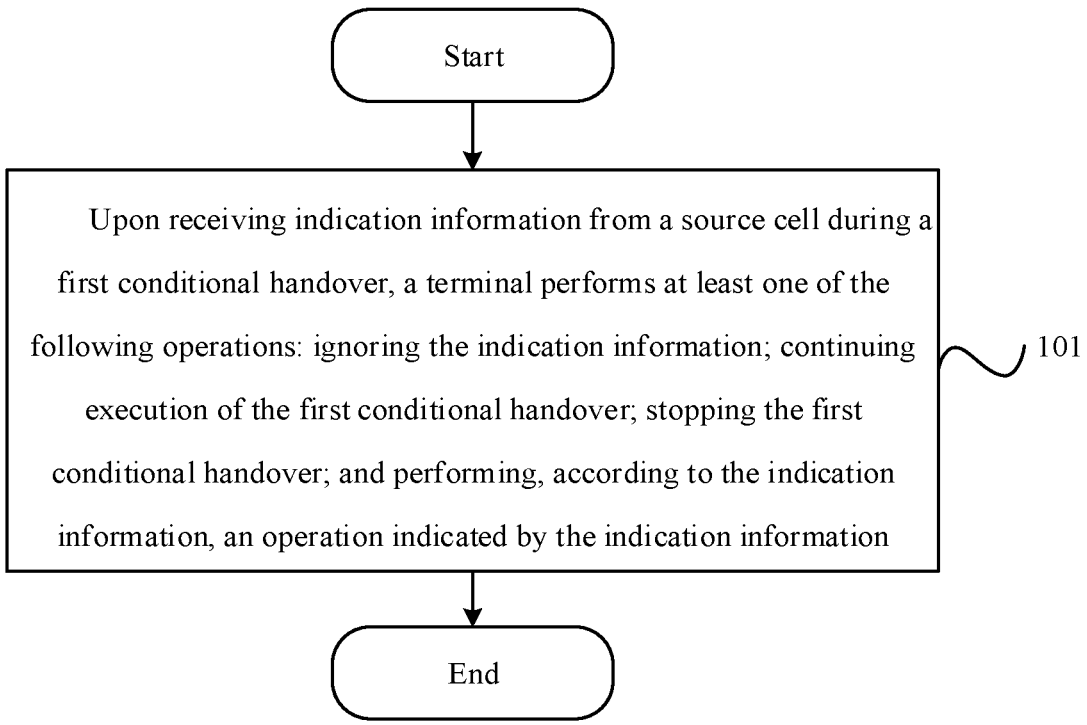
FIG. 1 is a flowchart of steps of a handover method according to an embodiment of this disclosure.

As shown in FIG. 1, an embodiment of this disclosure provides a handover method. The method is applied to a terminal and includes the following steps.

Step 101: Upon receiving indication information from a source cell during a first conditional handover, the terminal performs at least one of the following operations:
  ignoring the indication information;
  continuing execution of the first conditional handover;
  stopping the first conditional handover; and
  performing, according to the indication information, an operation indicated by the indication information.

Specifically, after the terminal receives the indication information from the source cell, the terminal may ignore the indication information, and/or continue execution of the first conditional handover; or
  after the terminal receives the indication information from the source cell, the terminal may stop the first conditional handover, and/or perform, according to the indication information, an operation indicated by the indication information.

Without loss of generality, in this embodiment of this disclosure, the foregoing conditional handover procedure includes:
  transmitting, by the source cell, a handover request to at least one candidate target cell;
  performing, by the candidate target cell, access control (optionally) on the terminal, meaning that the candidate target cell reserves or configures a resource for handover of the terminal, where the source is for the terminal to perform random access to the target cell;
  if access is allowed, transmitting, by the candidate target cell, a handover response to the source cell, where the handover response optionally includes a handover command (transmitted to the terminal transparently through the source cell);
  transmitting, by the source cell, a message with a handover command (for example, an RRC reconfiguration message or a mobility control message MobilityControl) to the terminal, where the message optionally includes a trigger condition for conditional handover; and
  if a measurement result of the terminal satisfies the trigger condition for conditional handover, initiating access to the corresponding target cell.

In this embodiment of this disclosure, initiating access to a cell includes: initiating a random access procedure or RRC connection establishment procedure or camp (attach) procedure to the cell.

In an optional embodiment, the terminal receives the indication information transmitted by the source cell, in one of the following stages:
  receiving the indication information transmitted by the source cell, after the terminal receives a conditional handover command or conditional handover trigger condition transmitted by the source cell;
  or
  receiving the indication information transmitted by the source cell, after the terminal determines that a trigger condition for conditional handover is satisfied;
  or
  receiving the indication information transmitted by the source cell, after the terminal initiates random access to a target cell;
  or
  receiving the indication information transmitted by the source cell, before the terminal successfully accesses a target cell.

In short, the terminal may receive the indication information transmitted by the source cell at any stage before successfully accessing a target cell.

Optionally, the indication information includes at least one of information A to information F below:

Information A: a handover command. The handover command is a handover command with no conditional handover trigger condition, which may also be referred to as a normal handover command.

Information B: a conditional handover command. The conditional handover command carries a trigger condition for conditional handover, where the conditional handover command may be consistent with a conditional handover command for the first conditional handover, or may be inconsistent with the conditional handover command for the first conditional handover, which is not specifically limited herein.

Information C: a trigger condition for conditional handover. In this embodiment of this disclosure, instead of being carried in a conditional handover command, the trigger condition for conditional handover may alternatively be transmitted separately. For example, the source cell first transmits a handover command with no conditional handover trigger condition (that is, a normal handover command), and then transmits the trigger condition for conditional handover within a preset time period. After receiving the normal handover command and the trigger condition, the terminal may determine a conditional handover being required.

Information D: a message for removing a conditional handover command. For example, remove signaling or release signaling. This message is used to indicate that a conditional handover command for the first conditional handover is invalid.

Information E: a message for removing a trigger condition for conditional handover. For example, remove signaling or release signaling. This message is used to indicate that a trigger condition for the first conditional handover is invalid.

Information F: configuration or reconfiguration information for conditional handover.

Optionally, the configuration or reconfiguration information for conditional handover includes at least one of the following:
  a trigger condition for conditional handover;
  a random access resource of a candidate target cell for conditional handover; and
  radio resource control RRC configuration information of a source cell.

It should be noted that at least one of the foregoing handover command, conditional handover command, conditional handover trigger condition, message for removing a conditional handover command, and message for removing a trigger condition for conditional handover may be carried by a radio resource control RRC message.

In an optional embodiment, the continuing execution of the first conditional handover in step 101 includes:

continuing to determine whether a measurement result satisfies a trigger condition for the first conditional handover;

or continuing to initiate random access to a target cell corresponding to the first conditional handover (or referred to as random access corresponding to the first conditional handover);

or continuing to complete a random access procedure with a target cell corresponding to the first conditional handover (or referred to as a random access procedure corresponding to the first conditional handover);

In another optional embodiment, the stopping the first conditional handover in step 101 includes:

stopping determining whether a measurement result satisfies a trigger condition for the first conditional handover;

or stopping initiating random access to a target cell corresponding to the first conditional handover;

or stopping a random access procedure with a target cell corresponding to the first conditional handover;

or stopping a first timer and/or second timer that is running, where the first timer is a timer for determining whether a conditional handover has failed, for example, the first timer is T304; and the second timer is a timer for controlling conditional handover configuration and deconfiguration, for example, the second timer is T3xx.

During running of the second timer, a handover command for the conditional handover is valid or configuration information for the conditional handover is valid; and otherwise, a handover command for the conditional handover is invalid or configuration information for the conditional handover is invalid.

Specifically, the second timer is used for determining whether a random access resource reserved or configured by a candidate target cell for handover of the terminal is valid. For example, during running of the second timer, the random access resource reserved or configured by the candidate target cell for handover of the terminal is valid; and when the second timer expires or stops, the random access resource reserved or configured by the candidate target cell for handover of the terminal is invalid.

In another optional embodiment, the performing, according to the indication information, an operation indicated by the indication information in step 101 includes:

performing a handover operation according to indication of the indication information; for example, performing a handover operation in a case that the indication information includes a handover command; where the handover command is a handover command with no conditional handover trigger condition, or referred to as a normal handover command.

Alternatively, the performing, according to the indication information, an operation indicated by the indication information in step 101 includes:

performing a conditional handover operation according to indication of the indication information.

Alternatively, the performing, according to the indication information, an operation indicated by the indication information in step 101 includes:

removing the first conditional handover according to indication of the indication information, for example, removing the first conditional handover in a case that the indication information includes a message for removing a conditional handover command.

Alternatively, the performing, according to the indication information, an operation indicated by the indication information in step 101 includes:

removing a trigger condition for the first conditional handover according to indication of the indication information, for example, removing a trigger condition for the first conditional handover in a case that the indication information includes a message for removing a trigger condition for conditional handover.

It should be noted that the performing a conditional handover operation according to indication of the indication information includes at least the following cases:

case 1: the indication information includes a conditional handover command;

case 2: the indication information includes a handover command and a handover command trigger condition;

case 3: the indication information includes a conditional handover command and configuration or reconfiguration information for conditional handover;

case 4: the indication information includes a handover command and configuration or reconfiguration information for conditional handover;

case 5: the indication information includes configuration or reconfiguration information for conditional handover; and case 6: the indication information includes a handover command trigger condition.

Optionally, the performing a conditional handover operation according to indication of the indication information includes:

performing a conditional handover operation according to configuration or reconfiguration information for conditional handover that is included in the indication information.

Further, the performing a conditional handover operation according to indication of the indication information includes:

in a case that the indication information includes configuration information of a target cell corresponding to the first conditional handover, performing the conditional handover operation according to the indication of the indication information; in other words, if the indication information includes configuration or reconfiguration information for the conditional handover or a conditional handover command that includes configuration information corresponding to a target cell to which access is being initiated, the conditional handover operation is performed according to the conditional handover command or configuration or reconfiguration information for the conditional handover that is included in the indication information;

or in a case that the indication information includes configuration information of a target cell corresponding to the first conditional handover, performing the conditional handover operation according to the configuration or reconfiguration information for the first conditional handover; in other words, if the indication information includes configuration or reconfiguration information for the conditional handover or a conditional handover command that includes configuration information corresponding to a target cell to which access is being initiated, the conditional handover operation is performed according to the configuration or reconfiguration information for the first conditional handover.

Optionally, in the case of performing a handover operation according to indication of the indication information, the method further includes:

stopping running a first timer and/or a second timer; or restarting a first timer and/or a second timer; where the first timer is a timer for determining whether a conditional handover has failed, for example, the first timer is T304; and the second timer is a timer for controlling conditional handover configuration and deconfiguration, for example, the second timer is T3xx.

During running of the second timer, a handover command for the conditional handover is valid or configuration information for the conditional handover is valid; and otherwise, a handover command for the conditional handover is invalid or configuration information for the conditional handover is invalid.

Specifically, the second timer is used for determining whether a random access resource reserved or configured by a candidate target cell for handover of the terminal is valid. For example, during running of the second timer, the random access resource reserved or configured by the candidate target cell for handover of the terminal is valid; and when the second timer expires or stops, the random access resource reserved or configured by the candidate target cell for handover of the terminal is invalid.

In an embodiment, the terminal ignores the indication information or continues execution of the first conditional handover in a case that the indication information satisfies any one of the following conditions:

the indication information includes no handover command, where the handover command is a handover command with no conditional handover trigger condition, or referred to as a normal handover command.

the indication information includes no configuration or reconfiguration information corresponding to a target cell to which the terminal is initiating random access; and the indication information includes no message for removing a conditional handover command that corresponds to a target node to which random access is being initiated or no message for removing a trigger condition for conditional handover that corresponds to a target node to which random access is being initiated.

In another embodiment, the terminal stops the first conditional handover in a case that the indication information satisfies any one of the following conditions:

the indication information includes a handover command, where the handover command is a handover command with no conditional handover trigger condition, or referred to as a normal handover command.

the indication information includes configuration or reconfiguration information corresponding to a target cell to which the terminal is initiating random access; and the indication information includes a message for removing a conditional handover command that corresponds to a target node to which random access is being initiated or a message for removing a trigger condition for conditional handover that corresponds to a target node to which random access is being initiated.

To sum up, in this embodiment of this disclosure, operations of a terminal after the terminal receives indication information from a source cell during a conditional handover are defined, thereby guaranteeing completeness of signaling and improving the handover procedure.

Figure 2:
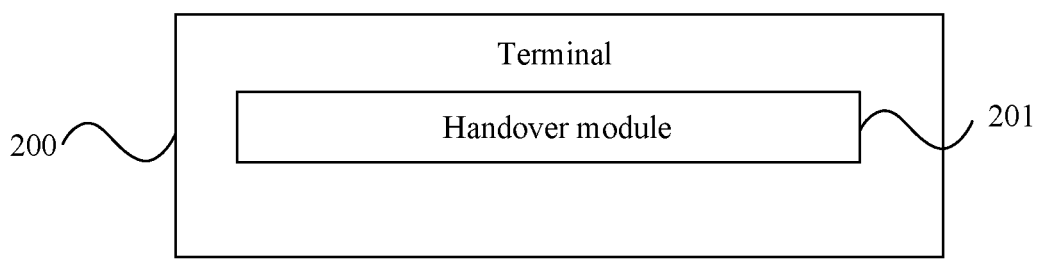
FIG. 2 is a first schematic structural diagram of a terminal according to an embodiment of this disclosure.

As shown in FIG. 2, an embodiment of this disclosure further provides a terminal 200, including:

a handover module 201, configured to, upon receiving indication information from a source cell during a first conditional handover, perform at least one of the following operations:

ignoring the indication information;

continuing execution of the first conditional handover;

stopping the first conditional handover; and performing, according to the indication information, an operation indicated by the indication information.

Optionally, in this embodiment of this disclosure, the indication information includes at least one of the following information:

a handover command;

a conditional handover command;

a trigger condition for conditional handover;

a message for removing a conditional handover command;

a message for removing a trigger condition for conditional handover; or configuration or reconfiguration information for conditional handover.

Optionally, in this embodiment of this disclosure, the configuration or reconfiguration information for conditional handover includes at least one of the following:

a trigger condition for conditional handover;

a random access resource of a candidate target cell for conditional handover; and radio resource control RRC configuration information of a source cell.

Optionally, in this embodiment of this disclosure, the handover module 201 further includes:

a first submodule, configured to continue to determine whether a measurement result satisfies a trigger condition for the first conditional handover; or configured to continue to initiate random access to a target cell corresponding to the first conditional handover; or configured to continue to complete a random access procedure with a target cell corresponding to the first conditional handover.

Optionally, in this embodiment of this disclosure, the handover module 201 further includes:

a second submodule, configured to stop determining whether a measurement result satisfies a trigger condition for the first conditional handover; or configured to stop initiating random access to a target cell corresponding to the first conditional handover; or configured to stop a random access procedure with a target cell corresponding to the first conditional handover; or configured to stop a first timer and/or second timer that is running, where the first timer is a timer for determining whether a conditional handover has failed; and the second timer is a timer for controlling conditional handover configuration and deconfiguration.

Optionally, in this embodiment of this disclosure, the handover module 201 further includes:

a third submodule, configured to perform a handover operation according to indication of the indication information; or configured to perform a conditional handover operation according to indication of the indication information; or configured to remove the first conditional handover according to indication of the indication information; or configured to remove a trigger condition for the first conditional handover according to indication of the indication information.

Optionally, in this embodiment of this disclosure, the handover module 201 further includes:

a fourth submodule, configured to perform a conditional handover operation according to the indication of the indication information in a case that the indication information includes configuration information of a target cell corresponding to the first conditional handover; or configured to perform a conditional handover operation according to configuration or reconfiguration information for the first conditional handover in a case that the indication information includes configuration information of a target cell corresponding to the first conditional handover.

Optionally, in this embodiment of this disclosure, the terminal further includes:

a processing module, configured to stop running a first timer and/or a second timer; or configured to restart a first timer and/or a second timer; where the first timer is a timer for determining whether a conditional handover has failed; and the second timer is a timer for controlling conditional handover configuration and deconfiguration.

Optionally, in this embodiment of this disclosure, during running of the second timer, a handover command for the conditional handover is valid or configuration information for the conditional handover is valid; and otherwise, a handover command for the conditional handover is invalid or configuration information for the conditional handover is invalid.

Optionally, in this embodiment of this disclosure, the handover module 201 further includes:

a fifth submodule, configured to ignore the indication information or continue execution of the first conditional handover in a case that the indication information satisfies any one of the following conditions:

the indication information includes no handover command;

the indication information includes no configuration or reconfiguration information corresponding to a target cell to which the terminal is initiating random access; and the indication information includes no message for removing a conditional handover command that corresponds to a target node to which random access is being initiated or no message for removing a trigger condition for conditional handover that corresponds to a target node to which random access is being initiated.

Optionally, in this embodiment of this disclosure, the handover module 201 further includes:

a sixth submodule, configured to stop the first conditional handover in a case that the indication information satisfies any one of the following conditions:

the indication information includes a handover command;

the indication information includes configuration or reconfiguration information corresponding to a target cell to which the terminal is initiating random access; and the indication information includes a message for removing a conditional handover command that corresponds to a target node to which random access is being initiated or a message for removing a trigger condition for conditional handover that corresponds to a target node to which random access is being initiated.

Optionally, in this embodiment of this disclosure, the handover module 201 further includes:

a seventh submodule, configured to receive the indication information transmitted by the source cell, after the terminal receives a conditional handover command or conditional handover trigger condition transmitted by the source cell;

or receive the indication information transmitted by the source cell, after the terminal determines that a trigger condition for conditional handover is satisfied;

or receive the indication information transmitted by the source cell, after the terminal initiates random access to a target cell;

or receive the indication information transmitted by the source cell, before the terminal successfully accesses a target cell.

The terminal provided in this embodiment of this disclosure can implement all processes implemented by the terminal in the method embodiment in FIG. 1. To avoid repetition, details are not described herein again.

To sum up, in this embodiment of this disclosure, operations of a terminal after the terminal receives indication information from a source cell during a conditional handover are defined, thereby guaranteeing completeness of signaling and improving the handover procedure.

It should be noted that the terminal provided in this embodiment of this disclosure is a terminal capable of executing the foregoing handover method, and all embodiments of the foregoing handover method are applicable to the terminal, with the same or similar beneficial effects achieved.

Figure 3:
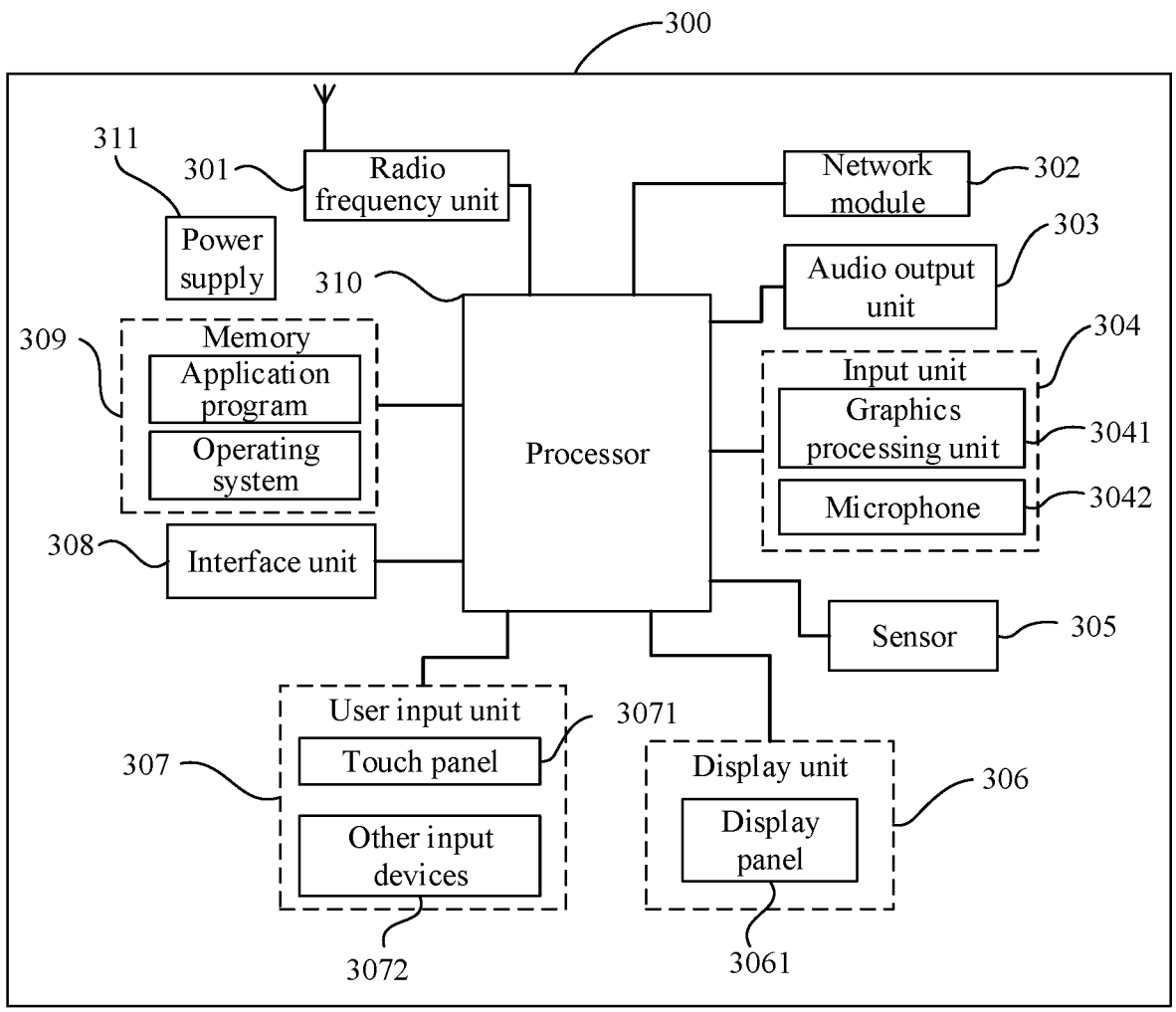
FIG. 3 is a second schematic structural diagram of a terminal according to an embodiment of this disclosure.

FIG. 3 is a schematic diagram of a hardware structure of a terminal for implementing the embodiments of this disclosure. The terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art can understand that the structure of the terminal shown in FIG. 3 does not constitute any limitation on the terminal, and the terminal may include more or fewer components than shown in the diagram, or some components may be combined, or the components may be arranged in different manners. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 301 is configured to receive, during a first conditional handover, indication information transmitted by a source cell.

The processor 310 is configured to perform at least one of the following operations:
- ignoring the indication information;
- continuing execution of the first conditional handover;
- stopping the first conditional handover; and
- performing, according to the indication information, an operation indicated by the indication information.

To sum up, in this embodiment of this disclosure, operations of a terminal after the terminal receives indication information from a source cell during a conditional handover are defined, thereby guaranteeing completeness of signaling and improving the handover procedure.

It should be noted that the terminal provided in this embodiment of this disclosure is a terminal capable of executing the foregoing handover method, and all embodiments of the foregoing handover method are applicable to the terminal, with the same or similar beneficial effects achieved.

It should be understood that, in this embodiment of this disclosure, the radio frequency unit 301 may be configured to transmit and receive a signal in an information transmitting/receiving or call process. Specifically, the radio frequency unit 301 receives downlink data from a base station and transmits the downlink data to the processor 310 for processing; and transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal provides a user with wireless broadband Internet access by using the network module 302, for example, helping the user to send and receive e-mails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may further provide audio output (for example, a call signal reception tone or a message reception tone) that is related to a specific function performed by the terminal 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or a video obtained by an image capture apparatus (for example, a camera) in an image capture mode or a video capture mode. A processed image frame may be displayed on the display unit 306. An image frame processed by the graphics processing unit 3041 may be stored in the memory 309 (or another storage medium) or transmitted by the radio frequency unit 301 or the network module 302. The microphone 3042 is capable of receiving sounds and processing such sounds into audio data. The processed audio data can be converted in a telephone call mode into a format that can be transmitted by the radio frequency unit 301 to a mobile communication base station, for outputting.

The terminal 300 may further include at least one sensor 305, for example, an optical sensor, a motion sensor, and other sensors. Specifically, the optical sensor may include an ambient light sensor and a proximity sensor. The ambient light sensor may adjust luminance of the display panel 3061 based on brightness of ambient light, and the proximity sensor may turn off the display panel 3061 and/or backlight when the terminal 300 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 305 may further include a fingerprint sensor, a pressure sensor, an iris sensor, a molecular sensor, a gyroscope, a barometer, a hygrometer, a thermometer, an infrared sensor, and the like. Details are not further described herein.

The display unit 306 is configured to display information input by the user or information provided to the user. The display unit 306 may include the display panel 3061. The display panel 3061 may be configured in a form of a liquid crystal display (LCD), an organic light-emitting diode (OLED), or the like.

The user input unit 307 may be configured to receive input digit or character information, and generate key signal input associated with user settings and function control of the terminal. Specifically, the user input unit 307 includes a touch panel 3071 and other input devices 3072. The touch panel 3071, or referred to as a touchscreen, may capture a touch operation performed by a user on or near the touch panel 3071 (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, transmits the touch point coordinates to the processor 310, and receives and executes a command transmitted by the processor 310. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function key (for example, a volume control key or a power on/off key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 for determining a type of the touch event. Then, the processor 310 provides a corresponding visual output on the display panel 3061 based on the type of the touch event. In FIG. 3, the touch panel 3071 and the display panel 3061 serve as two separate components to implement input and output functions of the terminal. However, in some embodiments, the touch panel 3071 and the display panel 3061 may be integrated to implement the input and output functions of the terminal. This is not specifically limited herein.

The interface unit 308 is an interface between an external apparatus and the terminal 300. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 308 may be configured to receive an input (for example, data information or power) from the external apparatus and transmit the received input to one or more elements within the terminal 300, or may be configured to transmit data between the terminal 300 and the external apparatus.

The memory 309 may be configured to store software programs and various data. The memory 309 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 309 may include a high-speed random access memory, and may further include a non-volatile memory such as a disk storage device, a flash memory device, or other volatile solid-state storage devices.

The processor 310 is a control center of the terminal, and is connected to all components of the terminal by using various interfaces and lines. By running or executing software programs and/or modules that are stored in the memory 309 and calling data stored in the memory 309, the processor 310 executes various functions of the terminal and processes data, so as to perform overall monitoring on the terminal. The processor 310 may include one or more processing units. Optionally, the processor 310 may integrate an application processor and a modem processor. The application processor mainly processes an operating system, a user interface, an application program, and the like. The modem processor mainly processes wireless communication. It can be understood that the modem processor may alternatively be not integrated in the processor 310.

The terminal 300 may further include a power supply 311 (for example, a battery) that supplies power to the components. Optionally, the power supply 311 may be logically connected to the processor 310 through a power management system, so as to implement functions such as charging management, discharging management, and power consumption management through the power management system.

In addition, the terminal 300 includes some functional modules that are not shown. Details are not described herein.

Optionally, an embodiment of this disclosure further provides a terminal, including a processor, a memory, and a computer program stored in the memory and capable of running on the processor. When the computer program is executed by the processor, the processes of the foregoing embodiments of the handover method are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing embodiments of the handover method are implemented, with the same technical effects achieved. To avoid repetition, details are not described herein again. For example, the computer-readable storage medium is a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to these embodiments. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

The foregoing descriptions are only specific embodiments of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A handover method, applied to a terminal, comprising:
upon receiving indication information from a source cell during a first conditional handover, performing, by the terminal:
stopping the first conditional handover; and,
performing, according to the indication information, an operation indicated by the indication information,
wherein the receiving, during a first conditional handover, the indication information transmitted by a source cell comprises:
receiving the indication information transmitted by the source cell, after the terminal initiates random access to a target cell;
wherein the stopping the first conditional handover comprises:
stopping a first timer and/or second timer that is running, wherein the first timer is a timer for determining whether a conditional handover has failed; and the second timer is a timer for controlling conditional handover configuration and deconfiguration;
wherein, during running of the second timer, a handover command for the conditional handover is valid or configuration information for the conditional handover is valid; and otherwise, a handover command for the conditional handover is invalid or configuration information for the conditional handover is invalid, and wherein the operation indicated by the indication information, the indication information comprises at least one of the following:

a conditional handover command;

a trigger condition for conditional handover; and, configuration or reconfiguration information for conditional handover.

2. The method according to claim 1, wherein the configuration or reconfiguration information for conditional handover comprises at least one of the following:

a trigger condition for conditional handover;

a random access resource of a candidate target cell for conditional handover; or, radio resource control RRC configuration information of a source cell.

3. The method according to claim 1, wherein the stopping the first conditional handover comprises:

stopping determining whether a measurement result satisfies a trigger condition for the first conditional handover;

or stopping initiating random access to a target cell corresponding to the first conditional handover;

or stopping a random access procedure with a target cell corresponding to the first conditional handover.

4. The method according to claim 1, wherein the performing, according to the indication information, an operation indicated by the indication information comprises:

performing a handover operation according to indication of the indication information;

or performing a conditional handover operation according to indication of the indication information;

or removing the first conditional handover according to indication of the indication information;

or removing a trigger condition for the first conditional handover according to indication of the indication information.

5. The method according to claim 4, wherein the performing a handover operation according to indication of the indication information comprises:

performing a conditional handover operation according to the indication of the indication information in a case that the indication information comprises configuration information of a target cell corresponding to the first conditional handover;

or performing a conditional handover operation according to configuration or reconfiguration information for the first conditional handover in a case that the indication information comprises configuration information of a target cell corresponding to the first conditional handover.

6. The method according to claim 4, wherein in the case of performing a handover operation according to indication of the indication information, the method further comprises:

continuing running a first timer and/or a second timer;

or restarting a first timer and/or a second timer; wherein the first timer is a timer for determining whether a conditional handover has failed; and the second timer is a timer for controlling conditional handover configuration and deconfiguration.

7. The method according to claim 1, wherein the terminal stops the first conditional handover in a case that the indication information satisfies any one of the following conditions:

the indication information comprises a handover command;

the indication information comprises configuration or reconfiguration information corresponding to a target cell to which the terminal is initiating random access; or, the indication information comprises a message for removing a conditional handover command that corresponds to a target node to which random access is being initiated or a message for removing a trigger condition for conditional handover that corresponds to a target node to which random access is being initiated.

8. A terminal, comprising a processor, a memory, and a program stored in the memory and capable of running on the processor, wherein when the program is executed by the processor, steps of a handover method are implemented, wherein the handover method comprises:

upon receiving indication information from a source cell during a first conditional handover:

stopping the first conditional handover; and, performing, according to the indication information, an operation indicated by the indication information, wherein the receiving, during a first conditional handover, the indication information transmitted by a source cell comprises:

receiving the indication information transmitted by the source cell, after the terminal initiates random access to a target cell;

wherein the stopping the first conditional handover comprises:

stopping a first timer and/or second timer that is running, wherein the first timer is a timer for determining whether a conditional handover has failed; and the second timer is a timer for controlling conditional handover configuration and deconfiguration;

wherein, during running of the second timer, a handover command for the conditional handover is valid or configuration information for the conditional handover is valid; and otherwise, a handover command for the conditional handover is invalid or configuration information for the conditional handover is invalid, and wherein the operation indicated by the indication information, the indication information comprises at least one of the following:

a conditional handover command;

a trigger condition for conditional handover; and, configuration or reconfiguration information for conditional handover.

9. The terminal according to claim 8, wherein the configuration or reconfiguration information for conditional handover comprises at least one of the following:

a trigger condition for conditional handover;

a random access resource of a candidate target cell for conditional handover; or, radio resource control RRC configuration information of a source cell.

10. The terminal according to claim 8, wherein the stopping the first conditional handover comprises:
stopping determining whether a measurement result satisfies a trigger condition for the first conditional handover;
or
stopping initiating random access to a target cell corresponding to the first conditional handover;
or
stopping a random access procedure with a target cell corresponding to the first conditional handover.

11. The terminal according to claim 8, wherein the performing, according to the indication information, an operation indicated by the indication information comprises:
performing a handover operation according to indication of the indication information;
or
performing a conditional handover operation according to indication of the indication information;
or
removing the first conditional handover according to indication of the indication information;
or
removing a trigger condition for the first conditional handover according to indication of the indication information.

12. The terminal according to claim 11, wherein the performing a handover operation according to indication of the indication information comprises:
performing a conditional handover operation according to the indication of the indication information in a case that the indication information comprises configuration information of a target cell corresponding to the first conditional handover;
or
performing a conditional handover operation according to configuration or reconfiguration information for the first conditional handover in a case that the indication information comprises configuration information of a target cell corresponding to the first conditional handover.

13. A non-transitory computer-readable storage medium, wherein the non-transitory computer-readable storage medium stores a program, and when the program is executed by a processor, steps of a handover method are implemented, wherein the handover method comprises:
upon receiving indication information from a source cell during a first conditional handover:
stopping the first conditional handover; and,
performing, according to the indication information, an operation indicated by the indication information,
wherein the receiving, during a first conditional handover, the indication information transmitted by a source cell comprises:
receiving the indication information transmitted by the source cell, after the terminal initiates random access to a target cell;
wherein the stopping the first conditional handover comprises:
stopping a first timer and/or second timer that is running, wherein the first timer is a timer for determining whether a conditional handover has failed; and the second timer is a timer for controlling conditional handover configuration and deconfiguration;
wherein, during running of the second timer, a handover command for the conditional handover is valid or configuration information for the conditional handover is valid; and
otherwise, a handover command for the conditional handover is invalid or configuration information for the conditional handover is invalid, and wherein the operation indicated by the indication information,
the indication information comprises at least one of the following:
a conditional handover command;
a trigger condition for conditional handover; and,
configuration or reconfiguration information for conditional handover.

* * * * *